United States Patent
Boecker et al.

(10) Patent No.: US 7,502,953 B2
(45) Date of Patent: Mar. 10, 2009

(54) DYNAMICALLY ADDING ADDITIONAL MASTERS ONTO MULTI-MASTERED IIC BUSES WITH TUNABLE PERFORMANCE

(75) Inventors: Douglas M. Boecker, Rochester, MN (US); Nathan D. Miller, Rochester, MN (US); Alwood P. Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 11/326,567

(22) Filed: Jan. 5, 2006

(65) Prior Publication Data
US 2007/0156936 A1  Jul. 5, 2007

(51) Int. Cl.
*G06F 1/12* (2006.01)
(52) U.S. Cl. ........................ 713/400; 713/375
(58) Field of Classification Search ................ 713/375, 713/400
See application file for complete search history.

(56) References Cited

U.S. PATENT DOCUMENTS

| | | | |
|---|---|---|---|
| 5,181,115 A * | 1/1993 | Flamm et al. | 348/537 |
| 2004/0088604 A1* | 5/2004 | Bland et al. | 714/43 |
| 2004/0255000 A1* | 12/2004 | Simionescu et al. | 709/208 |
| 2006/0064002 A1* | 3/2006 | Grist et al. | 600/410 |
| 2006/0064735 A1* | 3/2006 | Chen | 725/152 |

* cited by examiner

*Primary Examiner*—Tse Chen
(74) *Attorney, Agent, or Firm*—Dillon & Yudell LLP

(57) ABSTRACT

A method for coupling a collection of master devices on an Inter-Integrated Circuit (IIC) bus, where the collection of master devices includes at least one resident master device, generating a periodic, fixed interval tenure on the IIC bus, synchronizing at least one additional master device with the periodic, fixed interval tenure to enable the at least one additional master device to communicate on the IIC bus, and tuning a period value corresponding to a frequency of the periodic, fixed interval tenure to optimize the synchronizing, wherein the tuning further includes adjusting the period value to vary the frequency of the periodic, fixed interval tenure to balance between available IIC bus bandwidth and synchronization of the at least one additional master device.

5 Claims, 5 Drawing Sheets

DYNAMICALLY ADDING ADDITIONAL MASTERS ONTO MULTI-MASTERED IIC BUSES WITH TUNABLE PERFORMANCE

BACKGROUND OF THE INVENTION

1. Technical Field

The present invention relates in general to the field of data processing systems and similar technologies. More particularly, the present invention relates to a method for dynamically adding additional masters onto multi-mastered IIC buses.

2. Description of the Related Art

In today's electronics industry, seemingly unrelated designs often include common features such as a central controller (e.g., microcontroller), general purpose circuits (e.g., drivers and ports for external interfaces), and application-oriented circuits (e.g., digital tuning and signal processing circuits for radio and video systems).

The Inter-IC (IIC) bus specification enables communication between disparate integrated circuit (IC) devices via a two-line bus. The two bus lines typically include a serial data line (SDA) and a serial clock line (SCL). Each device coupled to the bus may be addressed by software utilizing a unique identification address. Also, simple master/slave relationships exist at all times on such a bus where master devices can act as master-transmitters or master-receivers. A true multi-master bus also includes collision detection and arbitration schemes to prevent data corruption if two or more master devices simultaneously initiate data transfers over the bus.

Those with skill in the art will appreciate that it is common to couple several slave devices via a physical or logical switch, such as a multiplexer, to an IIC bus. A master device may switch between the coupled slave devices by activating the physical or logical switch. However, as systems implementing an IIC bus become more complex, there is a need for coupling multiple master devices to an IIC bus. Currently, only slave devices may be coupled to an IIC bus via a multiplexer or any other physical or logical switch.

It is well-known in the art that when multiple master devices are coupled to an IIC bus, the masters must monitor the activity on the IIC bus for matching start and stop conditions to determine whether the bus is available. If a master device misses a start condition (e.g., because the particular master device was not coupled to or monitoring the IIC bus at the time the start condition occurred), the master device does not have any way of knowing that the IIC bus is busy with another data transfer.

Therefore, there is a need for a system and method for dynamically adding additional master devices onto a multi-mastered IIC bus which addresses the abovementioned limitations of the prior art.

SUMMARY OF THE INVENTION

The present invention includes a method for coupling a collection of master devices on an Inter-Integrated Circuit (IIC) bus, where the collection of master devices includes at least one resident master device, generating a periodic, fixed interval tenure on the IIC bus, synchronizing at least one additional master device with the periodic, fixed interval tenure to enable the at least one additional master device to communicate on the IIC bus, and tuning a period value corresponding to a frequency of the periodic, fixed interval tenure to optimize the synchronizing, wherein the tuning further includes adjusting the period value to vary the frequency of the periodic, fixed interval tenure to balance between available IIC bus bandwidth and synchronization of the at least one additional master device.

The above, as well as additional features of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1:
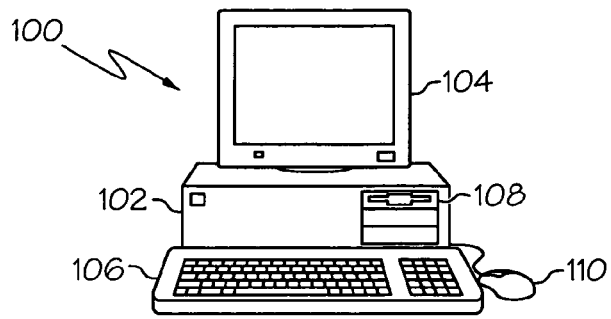
FIG. 1 is a pictorial illustration of an exemplary computer in which a preferred embodiment of the present invention may be implemented.

With reference to the figures, and in particular, with reference to FIG. 1, there is depicted a pictorial representation of a data processing system in which the present invention may be implemented according to a preferred embodiment. A computer 100 is depicted which includes system unit 102, video display terminal 104, keyboard, 106, storage devices 108, which may include floppy drives and other types of permanent and removable storage media, and mouse 110. Additional input devices may be included with computer 100, such as, for example, a joystick, touchpad, touch screen, trackball, microphone, and the like. Computer 100 can be implemented utilizing any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operating within computer 100.

Figure 2:
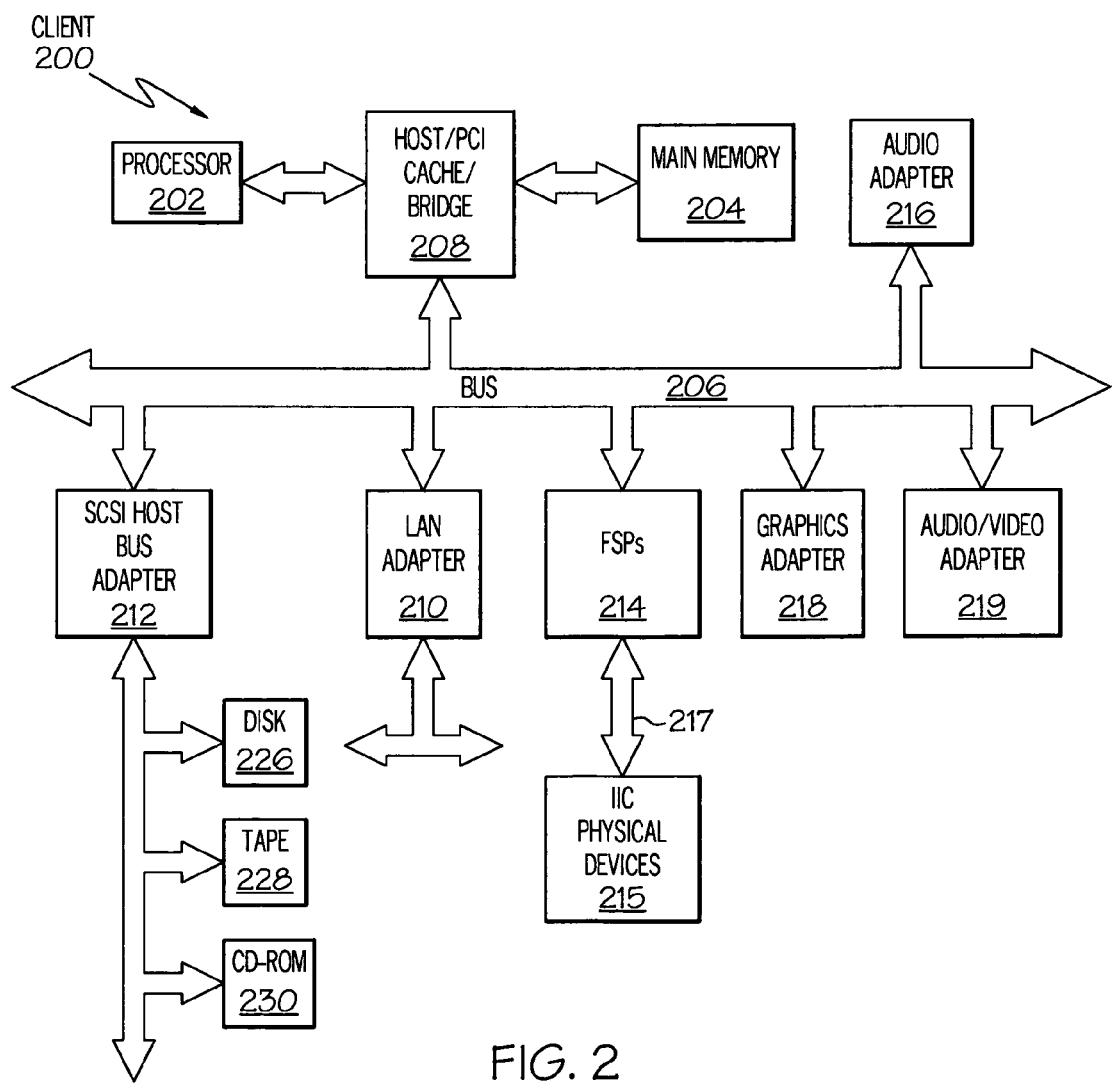
FIG. 2 illustrates a block diagram of an exemplary data processing system in which a preferred embodiment of the present invention may be implemented.

With reference now to FIG. 2, a block diagram of a data processing system is shown in which a preferred embodiment of the present invention may be implemented. Data processing system 200 is an example of a computer, such as computer 100 illustrated in FIG. 1, in which code or instructions implementing the processes of the present invention may be located. Data processing system 200 employs a peripheral component interconnect (PCI) local bus architecture; however, other bus architectures, such as Accelerated Graphics Port (AGP) and Industry Standard Architecture (ISA) may be used. Processor 202 and main memory 204 are coupled to PCI local bus 206 through PCI bridge 208. PCI bridge 208 also may include an integrated memory controller and cache memory for processor 202. Additional connections to PCI local bus 206 may be made through direct component interconnection. In the depicted example, local area network (LAN) adapter 210, small computer system interface (SCSI) host bus adapter 212, and flexible service processors 214 are connected to PCI local bus 206 by direct component connection. In contrast, audio adapter 216, graphics adapter 218, and audio/video adapter 219 are connected to PCI local bus 206 by add-in boards inserted into expansion slots.

Flexible service processors 214 provide PCI and IIC bus connections. In this example, flexible service processors 214 are connected to inter-integrated circuit physical devices 215 by IIC bus 217. Inter-integrated circuit (IIC) physical devices 215 include components, such as a control panel, a flexible service processor, a power device, and a memory.

SCSI host bus adapter 212 provides a connection for hard disk drive 226, tape drive 228, and CD-ROM drive 230. PCI local bus implementations will preferably support three or four PCI expansion slots or add-in connectors.

An operating system runs on processor 202 and is utilized to coordinate and provide control of various components within data processing system 200 of FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, or the like. As another example, data processing system 200 may be a stand-alone system configured to be bootable without relying on some type of network communication interface, whether or not data processing system 200 includes some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a personal data assistant (PDA). Data processing system 200 also may be a kiosk or a Web appliance.

Figure 3:
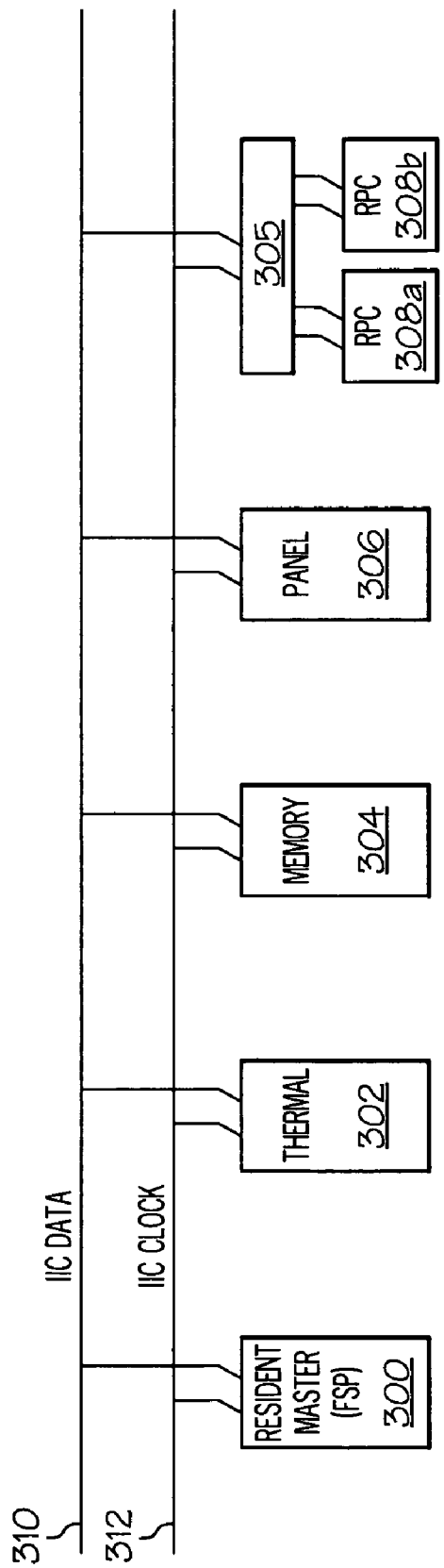
FIG. 3 depicts a more detailed diagram of exemplary IIC physical devices and IIC bus in which a preferred embodiment of the present invention may be implemented.

Referring now to FIG. 3, there is illustrated a diagram depicting physical devices utilizing in transferring data in accordance with a preferred embodiment of the present invention. The physical devices illustrated in FIG. 3 are examples of IIC physical devices 215 as depicted in FIG. 2.

In this example, resident master device 300 (implemented as a flexible service processor), thermal unit 302, memory 304, panel 306, and rack power controllers (RPC) 308a-b (coupled by switch 305) are coupled to an IIC bus, which includes data line 310 and clock line 312. As illustrated, resident master device 300 is implemented as a flexible service processor that executes an operating system and is initialized prior to initiating the rest of the data processing system. Resident master device 300 includes components, such as non-volatile memory, flash memory, and a controller to control various I/O devices. Resident master device 300 also controls a periodic, fixed interval tenure or "guaranteed activity" to facilitate multi-master device switching on the IIC bus, which is discussed herein in more detail in conjunction with FIGS. 4A-C.

Thermal unit 302 is a physical device that provides data processing system temperature data. Memory 304 is utilized to store data. Panel 306 is a physical device, such as a panel with a power, reset, and/or function buttons. Panel 306 may also be implemented as a directly connected, hot-plug device. A hot-plug device may be replaced when the system is operating, which may be changed out during concurrent maintenance (CCM) procedures. Rack power controllers 308a-b are physical devices that provide control functions for power to a data processing system. According to a preferred embodiment of the present invention, resident master device 300, panel 306, and rack power controllers 308a-b may be considered "master devices". Memory 304 and thermal unit 302 are characterized as "slave devices". As well-known in the art, many master devices can also be accessed as "slave devices" by another master device.

As previously discussed, when multiple master devices are coupled to an IIC bus, the masters must monitor the activity on the IIC bus for matching start and stop conditions to determine whether the bus is available. If a master device misses a start condition (e.g., because the particular master device was not coupled to or monitoring the IIC bus at the time the start condition occurred), the master device does not have any way of knowing whether the IIC bus is busy with another data transfer and makes the synchronization of the master device with the rest of the system unpredictable.

To remedy the abovementioned synchronization problem, resident master device 300 monitors or generates a periodic, fixed interval tenure or "guaranteed activity" on the IIC bus to enable synchronization of master devices. To guarantee activity on a multi-mastered IIC bus, one master (e.g., resident master device 300) must always be directly coupled to the IIC bus, as opposed to being coupled to the IIC bus via a switch (e.g., switch 305). When a master device detects the periodic, fixed interval tenure or "guaranteed activity", the master device may synchronize with the rest of the system.

A "guaranteed activity" may be a function that is accomplished during the normal operation of the system. An example of a guaranteed activity is a temperature reading monitored via an IIC thermal device (e.g., thermal unit 302) at a given interval by resident master device 300.

The rate of the guaranteed activity will affect the performance characteristics of other masters being added on the bus (via switch 305). For example, if the temperature measurement is monitored once a minute, a master device (e.g., a hot-plug panel 306 via a hot CCM procedure) may require up to a minute to synchronize with the IIC bus. It may be desirable to produce the guaranteed activity at a greater frequency. However, the frequency and duration of the guaranteed activity on the bus will affect bus performance.

In a preferred embodiment of the present invention, resident master device 300 may support a tunable guaranteed activity that can be set by other master devices. The implementation of a tunable guaranteed activity requires that resident master device 300 support a slave mode on the IIC bus to allow the other master devices to configure a tunable activity variable.

In another preferred embodiment of the present invention, resident master device 300's access to the IIC bus is controlled via hardware drivers that drive the IIC bus (e.g., device drivers). The guaranteed activity may involve sending out an IIC request in the form of a slave address indication with no accompanied data.

For example, the IIC request may be a default slave address in the form of a sequence of ones (e.g., 0x7F for 7-bit addressed devices). As previously discussed, a true, multimaster bus also includes collision detection and arbitration schemes to prevent data corruption if two or more master devices simultaneously initiate data transfers over the bus. The IIC standard collision detection and arbitration scheme would recognize that a request to the default slave address is of the lowest priority and should defer to any other request on the IIC bus.

An actual physical address is not required to be present at the default slave address. A no-acknowledgement (No-ACK) condition will appear on the IIC bus, but a matching start/stop sequence will still be present on the clock and data lines, which may be utilized by the master devices to synchronize with the rest of the system.

In still another preferred embodiment of the present invention, resident master device 300 has direct control of IIC data line 310 and IIC clock line 312. Resident master device 300's guaranteed activity may be pulsing IIC data line 310 while clock line 312 is in a HIGH condition on an idle IIC bus. The pulse generates a start and stop condition with no sent data. The previously mentioned collision and arbitration scheme will yield the control of the IIC bus to any other master device attempting to take control at the same time the pulse is generated. The duration of the pulse is minimal, with little, if any (due to yielded arbitration) effect on IIC bus performance.

Once a master device (e.g., panel 306 and/or rack power controllers 308*a-b*) is switched onto a multi-mastered IIC bus, it enters an inactive state until synchronization occurs. If the master device is switched onto the IIC bus while the IIC bus is in an idle state, the master device will receive a start/stop sequence (generated by the "guaranteed activity") to synchronize onto the IIC bus. If the master device is switched onto the IIC bus during a data transfer, the master device will receive a stop condition, but miss the start condition. Therefore, the master device must monitor the IIC bus for a stop condition to synchronize with the rest of the system. Once a valid stop condition is detected, the master device enters a normal, active state on the IIC bus.

Figure 4A:
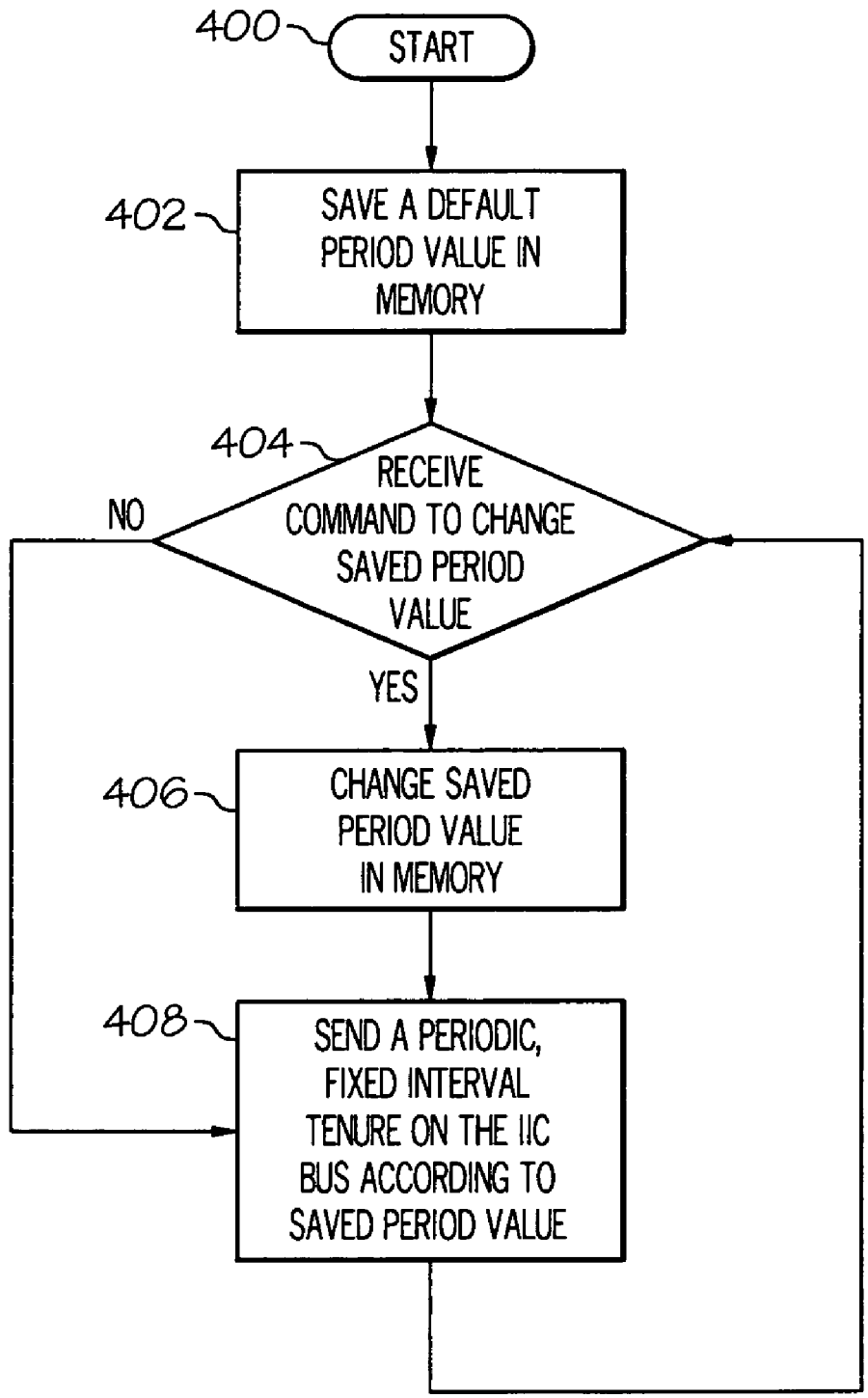
FIG. 4A-C are high-level logical flowchart diagrams illustrating an exemplary method of dynamically adding additional master devices onto multi-mastered IIC buses according to a preferred embodiment of the present invention.
Figure 4B:
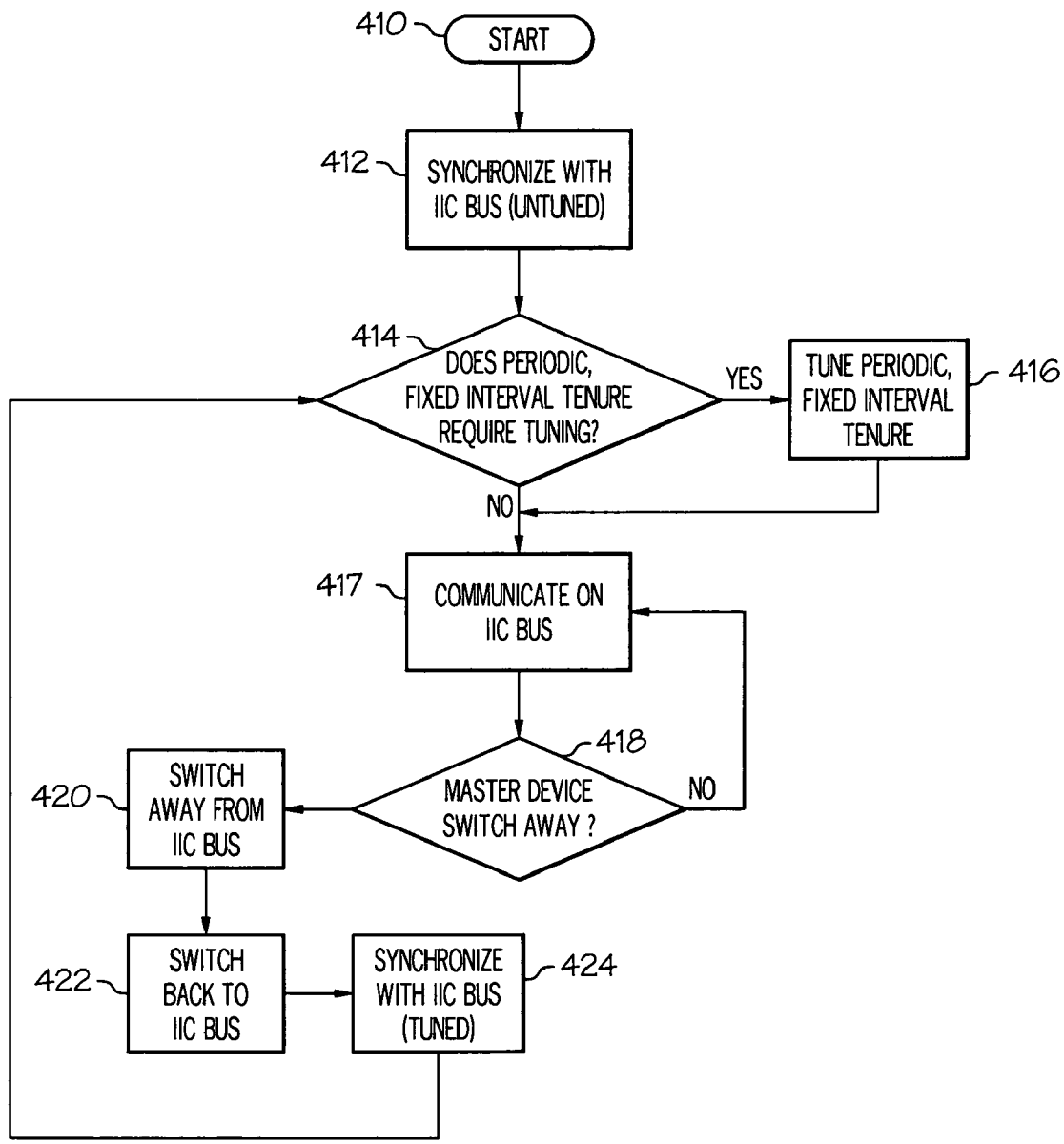
Figure 4C:
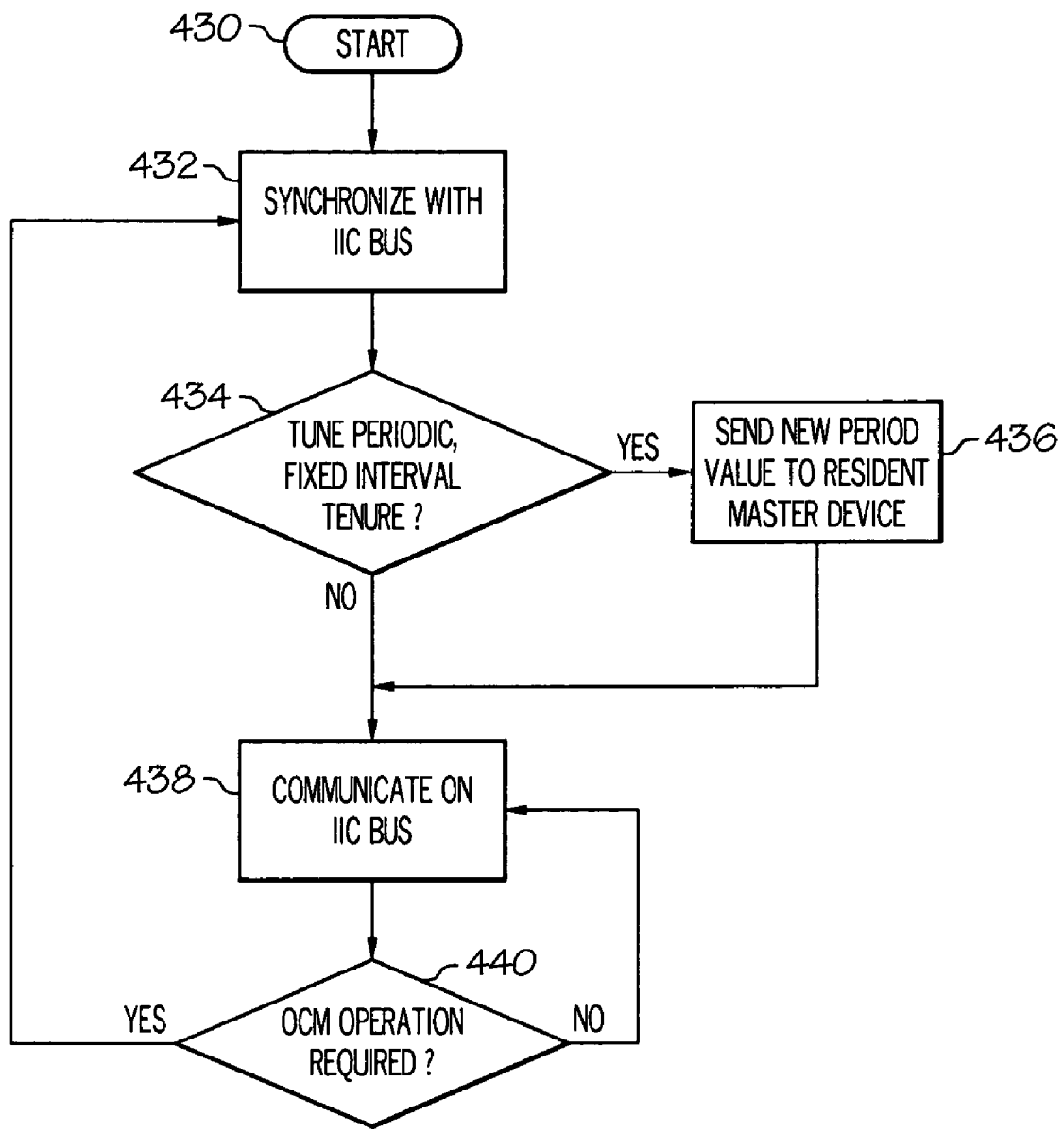

Referring now to FIGS. 4A-C, there are depicted high-level logical flowchart diagrams illustrating an exemplary method of dynamically adding additional master devices onto multi-mastered IIC buses according to a preferred embodiment of the present invention.

With reference to FIG. 4A, there is illustrated a flowchart diagram for operation of resident master device 300 according to a preferred embodiment of the present invention. As illustrated, the process begins at step 400 and proceeds to step 402, which illustrates resident master device 300 saving a default period value in a memory. The default period value is later utilized by resident master device 300 to send out periodic, fixed interval tenures on the IIC bus to enable the synchronization of master devices, as discussed herein in more detail. As previously discussed, the periodic, fixed interval tenure or "guaranteed activity" may be implemented by a regular system event (e.g., a periodic temperature reading), a request to a default slave address, a pulsing of IIC data line 310 while IIC clock line 312 is in a HIGH state, or any other periodic, fixed interval activity on the IIC bus.

The process continues to step 404, which illustrates a determination of whether resident master device 300 has received a command to alter the period value saved in memory. If resident master device 300 has not received a command to alter the period value saved in memory, the process proceeds to step 408, which illustrates resident master device 300 sending a periodic, fixed interval tenure on the IIC bus according to the saved period value in memory. The process returns to step 404 and proceeds in an iterative fashion.

Returning to step 404, if resident master device 300 has received a command (sent from a master seeking to reconfigured synchronization) to change the saved period value, the process continues to step 406, which illustrates resident master device 300 saving a new period value into memory. The process then continues to step 408 and continues in an iterative fashion.

With reference now to FIG. 4B, there is illustrated a high-level logical flowchart diagram depicting the operation of a switched master device seeking synchronization with the IIC bus according to a preferred embodiment of the present invention. In a preferred embodiment of the present invention, a switched master device (e.g., RPC 308*a-b*) is coupled to the IIC bus via a switch (e.g., switch 305) and may be switched on or off the IIC bus during operation of the system. Each time a switched master device is switched on to the IIC, it must synchronize with the bus again. The first time the switched master device is switched on to the IIC bus, the periodic, fixed tenure may not be optimally tuned to the particular switched master device. For example, if RPC 308*a-b* are capable of being switched every second and the current saved period value (referenced in conjunction with FIG. 4A) is set at one minute, RPC 308*a-b* may tune the period value to a smaller value to facilitate more frequent switching.

Still referring to FIG. 4B, the process begins at step 410 and continues to step 412, which illustrates a switched master device synchronizing with the IIC bus based on an untuned periodic, fixed interval tenure. The process continues to step 414, which depicts a determination made by the switched master device as to whether the periodic, fixed interval tenure requires tuning. As previously discussed, the periodic, fixed interval tenure may be set at too long of a period value, which increases the synchronization time of the switched master device and allows for higher bus throughput. The fixed interval tenure may be changed to a shorter period value to improve synchronization time at the possible expense of bus throughput due to the more frequent guaranteed activity.

If the switched master device determines that the periodic, fixed interval tenure requires tuning, the process proceeds to step 416, which illustrates the switched master device tuning the periodic, fixed interval tenure by sending a message to resident master device 300 to request a change in the saved period value. The process then continues to step 417. If the switched master device determines that the tenure does not require tuning, the process proceeds to step 417, which illustrates the switched master device communicating on the IIC bus.

After communicating on the IIC bus, the switched master device determines whether it requires a switch away from the IIC bus, as depicted in step 418. A switched master device may require a switch away from the bus to another bus to communicate, perform task, or for other reasons. If the switched master device requires a switch away from the IIC bus, the process continues to steps 420 and 422, which illustrate the switched master device switching away and then switching back to the IIC bus. Once the switched master switches back to the IIC bus, the process proceeds to step 424, which depicts the switched master synchronizing with the IIC bus. The process then returns to step 414 and proceeds in an iterative fashion. Returning to step 418, if the switched master device does not require a switch away from the IIC bus, the process returns to step 417 and continues in an iterative fashion.

Referring now to FIG. 4C, there is illustrated a high-level logical flowchart diagram depicting an exemplary method of adding hot-plug master devices to an IIC bus according to a preferred embodiment of the present invention. As previously discussed, a hot-plug master device (e.g., panel 306) is a device that may be removed and replaced (e.g., concurrent maintenance (CCM)) during system operation. Each time the hot-plug device is coupled to the IIC bus, the hot-plug device requires synchronization with the bus. Since the periodic, fixed interval tenure was tuned during the first synchronization, the tenure should not require tuning again, unless the saved period value has been changed by another master device that required synchronization.

The process begins at step 430 and proceeds to step 432 which illustrates a hot-plug master device synchronizing with the IIC bus utilizing a periodic, fixed interval tenure. The process continues to step 434, which illustrates the hot-plug master device determining whether the periodic, fixed interval tenure requires tuning to facilitate the synchronization of the device. If the periodic, fixed interval tenure requires tuning, the process proceeds to step 436, which depicts the hot-plug master device sending a new period value to resident master device 300. The process continues to step 438. If the periodic, fixed interval tenure does not require tuning, the process proceeds to step 438, which illustrates the hot-plug master device communicating on the IIC bus.

The process continues to step 440, which depicts the hot-plug master device determining if a CCM procedure is required. In a preferred embodiment of the present invention, the concurrent maintenance (CCM) procedure involves removing the present hot-plug master device and replacing it with a second hot-plug master device during system operation. If a CCM operation is not required, the process returns to step 438 and continues in an iterative fashion. If a CCM operation is required, the process returns to step 432 and continues in an iterative fashion.

As described, the present invention includes a method, system, and computer-usable medium for coupling a collection of master devices on an Inter-Integrated Circuit (IIC) bus, where the collection of master devices includes at least one resident master device, generating a periodic, fixed interval tenure on the IIC bus, synchronizing at least one additional master device with the periodic, fixed interval tenure to enable the at least one additional master device to communicate on the IIC bus, and tuning a period value corresponding to a frequency of the periodic, fixed interval tenure to optimize the synchronizing.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

What is claimed is:

1. A computer-implementable method comprising:
    coupling a plurality of master devices on an Inter-Integrated Circuit (IIC) bus, wherein said plurality of master devices includes at least one resident master device;
    generating a periodic, fixed interval tenure on said IIC bus;
    synchronizing at least one additional master device with said periodic, fixed interval tenure to enable said at least one additional master device to communicate on said IIC bus; and
    tuning a period value corresponding to a frequency of said periodic, fixed interval tenure to optimize said synchronizing, wherein said tuning further includes adjusting said period value to vary said frequency of said periodic, fixed interval tenure to balance between available IIC bus bandwidth and synchronization of said at least one additional master device.

2. The computer-implementable method according to claim 1, further comprising:
    switching said at least one additional master device away from said IIC bus;
    re-establishing a connection between said at least one additional master device and said IIC bus by synchronizing said at least one additional master device said periodic, fixed interval tenure tuned by said tuning.

3. The computer-implementable method according to claim 1, wherein said periodic, fixed interval tenure is a periodic temperature reading.

4. The computer-implementable method according to claim 1, wherein said periodic, fixed interval tenure is a periodic IIC request sent on said interconnect to a default slave address.

5. The computer-implementable method according to claim 1, wherein said periodic, fixed interval tenure is a pulse of an IIC data line while an IIC clock line is in a HIGH condition when said interconnect is idle.

* * * * *